Sept. 16, 1969        G. TOOBY        3,466,756
METHOD FOR DEHYDRATING MATERIALS
Filed Nov. 6, 1967        2 Sheets-Sheet 2

INVENTOR.
GEORGE TOOBY
BY
Christie, Parker + Hale
ATTORNEYS.

United States Patent Office 3,466,756
Patented Sept. 16, 1969

3,466,756
METHOD FOR DEHYDRATING MATERIALS
George Tooby, 1355 Circle Drive,
San Marino, Calif. 91108
Filed Nov. 6, 1967, Ser. No. 680,741
Int. Cl. F26b 5/06, 21/14, 3/04
U.S. Cl. 34—5                                      13 Claims

ABSTRACT OF THE DISCLOSURE

A method for dehydrating materials particularly adapted for freeze drying a heat sensitive product. The product to be dried is arranged in a preselected side-by-side relationship with a desiccant so that when a drying gas is passed over the product any moisture derived from the product is removed by the desiccant as the gas passes thereover.

---

Figure 1:
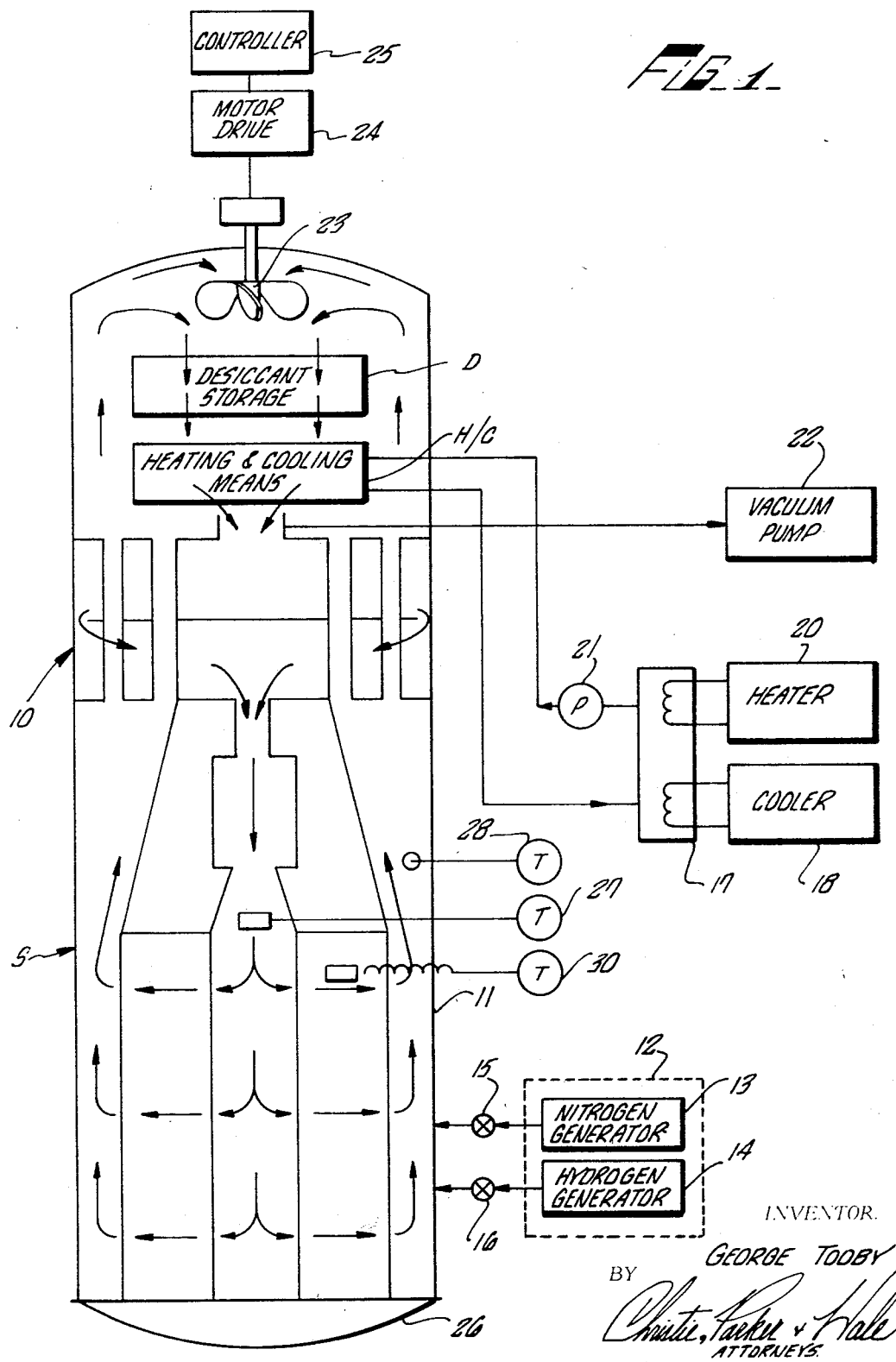

This invention relates to an improved method for dehydrating materials and in particular to an improved method for freeze drying materials.

This application is an improvement over the teachings of my copending application bearing Ser. No. 489,515, filed on Sept. 23, 1965, entitled Method and Apparatus for Dehydrating Materials.

The unexpected results of the teachings of the above-identified application are based on the fact that if a product, any heat sensitive product, is carefully frozen to optimize ice crystal size, and therefore leaving capillaries when the ice is sublimed, and then subjecting the frozen product to a high velocity flow of a warm, dry, inert gas at a reduced pressure, said pressure being about one-twentieth of an atmosphere and about fifty times as great as the pressure used in previously practiced freeze drying, it will dry rapidly and at a constant rate, without thawing, to produce a dehydrated product which rehydrates quickly and completely. Under these controlled conditions the product maintains itself at a temperature substantially below the temperature of the gas stream and will not thaw if carefully protected so that it receives heat only from the gas stream and not by radiataion or conduction from other heat sources.

Specifically, the method of freeze drying disclosed in that copending application includes the provision of a cylindrical drying chamber that is adapted for both freezing a product undergoing drying and freeze drying the product. The drying chamber includes a portion adapted to store a product undergoing drying with a minimum of contact and thereby heat transfer from the supporting structure to allow the product to be subjected to the freezing and drying gases as completely as possible without altering the characteristics of the product due to heat received from the supporting structure. To this end, the product stored within the drying chamber is subjected to a controlled cold stream of an inert gas, such as nitrogen, to freeze the product including the liquid or water within the product. The freezing is controlled to produce ice crystals throughout for defining capillaries upon sublimation of the ice crystals. The nitrogen gas is then exhausted from the drying chamber and the exhausted chamber is filled with an inert dry gas, such as hyrdogen, introduced therein at a sub-atmospheric pressure within the range of 20 to 80 millimeters of mercury, absolute pressure, and at a preselected velocity. The temperature of the gas is proportioned to provide the heat of sublimation to the product and passed thereover at a velocity to cause the sublimation vapors to be simultaneously carried away. Specifically, the temperature of the hydrogen gas and the velocity with which it is passed over and in contact with the product undergoing drying are proportioned to maintain the rate of heat transfer and the rate of diffusion of the liquid in balance to cause the product to dry uniformly, completely and linearly with time. The internal temperature of the product during the drying period is by this means controlled to not only preserve the basic product characteristics but also the capillaries defined during freezing.

In the referenced copending application, the drying gas is recirculated through a refrigeration system where the moisture is condensed on to refrigeration coils as ice. It has been found that as ice forms on the refrigeration coils friction is produced in the gas system reducing the volume of gases that can be handled. As the volume of gas circulating in the system decreases the velocity of the gas over the product decreases and both the drying rate and the quantity of product which may be dried goes down. Accordingly in any drying system, and in particular a freeze drying system, it is desirable to eliminate the necessity for the refrigeration cycles as this decreases the cost of the system, permits the maintenance of the initial high rate of drying, increases the amount of product which may be dried, and avoids the necessity of defrosting the refrigeration coils. The present invention which substitutes beds of desiccant which may be regenerated outside the drying system for the refrigeration coils avoids these prior art problems.

The present invention provides an improved method of drying and may be employed for various products, such as drying grains, fruits, paste products, wood products, ceramics, etc., although it is particularly adapted for freeze drying products such as beef patties and the like. When the invention is applied to freeze drying products, it has been found that the drying time is reduced from approximately eight hours to three hours drying time without the product undergoing drying being heated to temperatures in excess of 100 degrees Fahrenheit, thereby resulting in an improved quality of the dried product. The improved method of drying, including the freeze drying method, avoids the necessity of a refrigeration system and therefore does not require any defrosting between drying cycles. Any apparatus embodying the method of the present invention may then be used continuously and therefore provides a more efficient drying process and one wherein a higher rate of drying is possible than presently known drying procedures. Specifically, as applied to freeze drying apparatus, the per unit capacity of the apparatus embodying the invention is approximately 20 percent of the cost of conventional freeze drying apparatus. The present invention may be employed for both batch drying cycles or continuous drying cycles where the drying chamber may be continuously and successively employed as a result of the elimination of the refrigerating system and the necessity for defrosting the same between drying operations.

Broadly, the method of the present invention comprehends the arranging of a heat-sensitive product to be dried in a gas drying chamber with a desiccant whereby the product to be dried and the desiccant may be arranged in a preselected pattern of product and desiccant. With this arrangement of the product and desiccant, a drying gas is circulated through a drying chamber so that the drying gas flows across the surface of the product undergoing drying, and then successively and immediately flows across the surface of the desiccant whereby the drying gas acts as a vehicle for transferring the moisture from the produce undergoing drying to the desiccant.

When the method is particularly adapted to freeze drying materials, it comprehends the steps of providing a frozen product to be dried arranged with a preselected desiccant in a pattern of product and desiccant to allow a drying gas to successively pass over the surfaces of the product and the desiccant. Once the product and desiccant are arranged in a drying chamber in this fashion the method includes maintaining the frozen product and desiccant at a preselected sub-atmospheric pressure, and then passing a heated inert gas, such as hydrogen, at the sub-atmospheric pressure over the pattern of frozen product and desiccant to supply the heat of sublimation to the frozen liquid in the product to cause the moisture removed from the product to be transferred to the desiccant as a result of the drying gas passing over the product and then the desiccant until the product is uniformly and completely dried. When a continuous freeze drying operation is effected, the drying gas is continuously circulated through the drying chamber. The recirculating gas is cooled to compensate for the heat resulting from the transfer of the moisture from the frozen product to the desiccant, the cooling being sufficient to avoid the continuous increase of temperature within the product and preventing thawing of the frozen product. In addition, the method may comprehend the monitoring of the temperature of the recirculating gas as it approaches the frozen product and the temperature of the gas as it leaves the product, and determining when the two are substantially identical for terminating the drying process.

Figure 2:
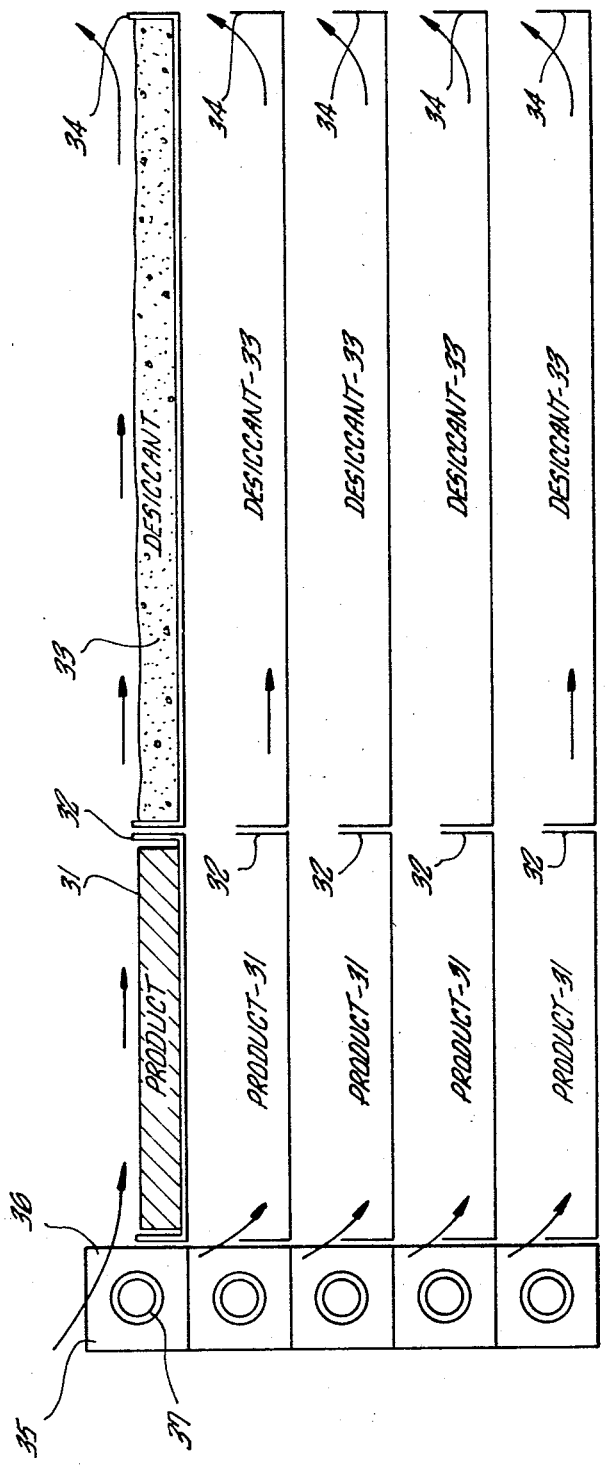

These and other features of the present invention may be more fully appreciated when considered in the light of the following specifications and drawings, in which:

FIG. 1 is a diagrammatic illustration of a horizontal sectional view of a drying chamber and the associated apparatus embodying the present invention; and FIG. 2 is a schematic illustration of a pattern of product and desiccant as may be arranged in the drying chamber of FIG. 1 in accordance with the present invention.

In the aforementioned copending patent application bearing Ser. No. 489,515, a specific drying chamber and associated elements are disclosed and claimed for freeze drying materials including food products such as meat patties. It should be recognized at the outset that the present invention may be employed for other than freeze drying operations but, to facilitate the understanding of the present invention, it will be described in conjunction with a freeze drying operation of the type disclosed in said application. Accordingly, the teachings of the copending application are incorporated herein by reference and only that portion of the disclosure that is necessary for a complete understanding of the present invention will be included herein.

Basically, the present invention differs from the freeze drying method and apparatus of the copending application in the elimination of the refrigeration system for the freeze drying operation, and employing a fluid-absorbent material or a desiccant in lieu thereof to extract the moisture from the drying gas that has been removed from the product undergoing drying, as will be described more fully hereinafter. Accordingly, the freezing of the product to be dried will not be considered herein since the freezing can be accomplished by the structures and methods disclosed in my copending application or any other convenient method. The drying chamber 10 of the present invention as illustrated in the drawing is generally similar to the drying chamber of said application but has been modified in accordance with the teachings of the present invention. Initially, the concept of the present invention will be described to reflect the broad concept of the elimination of the refrigeration system.

Now referring to the drawings, a detailed examination of the structure of the drying chamber 10 for dehydrating in accordance with the present invention will be described.

The drying chamber 10 broadly comprehends a generally cylindrical metallic shell 11 capable of withstanding an external pressure of one atmosphere. The drying chamber 10 can be considered to be divided into a heating or heat exchange section H/C, a product storage section S for storing the product to be dried, and a desiccant storage section D. The drying chamber 10 includes a source of gas 12 coupled thereto for freezing and drying a product. The gas source 12 is diagrammatically illustrated in block form and includes a pair of individual gas generators shown as the nitrogen gas generator 13 and the hydrogen gas generator 14. Each of these generators 13 and 14 are controllably coupled to the drying chamber 10 by means of individual control valves 15 and 16 for controlling the entry of the respective nitrogen and hydrogen gases into the chamber.

The drying chamber 10 is defined with the aforementioned three sections and a central or axial passageway through the drying chamber to allow the gas introduced therein to be conveyed horizontally through each of the sections. The drying cylinder is further defined to allow the entrapped gas to circulate outside of the axial passage to the outer walls of the chamber through the storage section S. The gas then passes backward through the sections S, D, and H/C in the reverse direction, in the passageway defined between the outer walls of the shell 11 and the walls defining the central passageway. In this fashion, the freezing or drying gas introduced into the chamber can be successively passed through the heat exchange section H/C and the product storage section S whereby its temperature is successively modified and then recirculated back through in the reverse order to again be successively modified, in the reverse order.

The heating and cooling system for controlling the temperature of the gas entrapped in the drying chamber 10 comprises a tank 17 for storing a fluid coolant such as ethylene glycol and connected with a cooling unit 18 and a heating unit 20. The fluid in the tank 17 may be controllably heated or cooled by means of the respective units 20 or 18. The fluid in the tank 17 is pumped by means of a pump 21 through a piping system (not shown) arranged in the drying chamber section H/C and back into the tank 17. The passage of the entrapped gas in the drying chamber over the piping system or through the H/C section is effective for controlling the temperature of the circulating gas in accordance with the operation of either the cooling unit 18 or the heating unit 20.

A preferable desiccant to be used in the practice of this invention is a synthetic zeolite such as the molecular sieve manufactured by the Union Carbide & Chemical Corporation. Any other liquid absorbent of this type may be employed.

Along with the heating and cooling system there is provided a vacuum pump for exhausting the drying chamber and maintaining a preselected sub-atmospheric pressure therein. For this purpose, a vacuum pump 22 is provided to maintain the reduced pressure within the drying chamber 10. The pump 22 is exhausted to the atmosphere.

To circulate the gas within the chamber 11 through the three sections, a fan 23 is provided and mounted to an end of the desiccant storage section D of the drying chamber 11 opposite the entrance to the axial passageway.

The vacuum pump 22 and its associated compressor (not shown) is powered in this instance by means of a diesel engine or the like as described in the aforementioned patent application. The fan 23 is driven by a motor 24 illustrated in block form and characterized as the motor drive 24 and is controlled through a motor controller 25.

The operation of the refrigeration system and the vacuum system is such that the vacuum pump 22 is operated to evacuate the drying chamber 10 to the desired pressure prior to the introduction of the inert gas therein, or to maintain the entrapped gas at the desired pressure. The stream of gas in the axial passage leaving the H/C section passes through the axial passage of the drying chamber into the product storage section S. The gas leaving the section H/C enters the storage section S at its final drying temperature to cause the sublimation of the ice in the frozen product. The preferred gas for dehydration is hydrogen that is maintained at a sub-atmospheric pressure on the order of 24 millimeters of mercury at a temperature of approximately 175 degrees Fahrenheit and a velocity on the order of two thousand feet per minute.

The storage section S is diagrammatically illustrated as a pair of storage sections $S_L$ and $S_R$ in FIG. 1 and the sections each include a plurality of vertically defined storage shelves for accepting trays storing the product to be dehydrated, as in the aforementioned copending application.

Once the product to be dried is stored on the trays 32, it is introduced into the drying chamber 10 by means of the door 26 hinged to the front end of the drying chamber 10, as illustrated in FIG. 1.

An important feature of the present invention is the monitoring and control of the temperature of recirculating gas as it approaches the frozen product and the temperature of the gas as it leaves the product. When these temperatures are identical the product is dried. For this purpose the temperature of the heated gas in the axial passageway upon entering the storage section S is sensed by means of a thermocouple 27 supported in the gas stream in this passageway. Also, a thermometer 28 signals the temperature of the gas leaving the storage section S. In the same fashion, the temperature of the product undergoing drying is determined by the provision of a resistance thermometer 30 positioned in the center of the product.

With the above structure of the drying chamber in mind, the general procedure for dehydrating a product will now be examined. It should be appreciated that the method and apparatus of the present invention is adaptable to any heat-sensitive product including both solid and liquid foods. Assuming, then, that the product to be dried is frozen, either before entry into the drying chamber 10 or by means of the procedures described in my copending application, the dehydrating method will be examined. It will also be assumed that the drying chamber will have been exhausted to the proper sub-atmospheric temperature and the oxygen has been removed therefrom. In addition, the gas temperature and velocity will be as mentioned hereinabove.

With the hydrogen gas circulating in the chamber, the dehydration takes place. The recirculating gas passes through the storage section S and over the surface of the product undergoing drying. In passing over the product, the heated gas supplies the heat of sublimation to the frozen liquid in the product to cause the moisture removed from the product to be conveyed away from the product. The moisture-laden gas is circulated to the desiccant storage section D to cause the moisture to be transferred to the desiccant. It has been found that as a result of the transfer of the moisture from the frozen product to the desiccant the gas is heated. Accordingly, prior to the gas re-entering the storage section S, the gas is cooled to compensate for this heating thereby avoiding the continuous increase in the temperature of the gas on recirculation whereby the frozen product is prevented from thawing. This drying process continues until the temperatures indicated by the sensing devices 27 and 28 are the same, at which time the drying cycle is complete. At the completion of the drying cycle, the dehydrated product is removed from the drying chamber. Also, the water-laden desiccant is removed and may be immediately replaced with other desiccant that has had all of the water vapor removed or with the same desiccant after it has been heated to drive out all of the water vapor. The drying chamber, in any event, may be re-employed for the succeeding drying cycle without the need for a defrosting period.

Now referring to FIG. 2, another embodiment of the invention will be described wherein the desiccant or absorbent is arranged in the product storage S area along with the product. In FIG. 2, the product to be dried 31 is stored on individual trays 32 and the desiccant 33 is stored on individual trays 34. It should be appreciated, however, that both the product 31 and the desiccant 33 may be stored on the same tray in accordance with the teachings of this invention.

In addition to the relocation of the desiccant storage, the present embodiment of the drying chamber has the heating and cooling means relocated immediately adjacent the product storage tray whereby the recirculating drying gas immediately upon emerging from the heating and cooling means contacts the product 31 stored on the product storage trays 32. For this purpose, the heating and cooling means is illustrated as comprising a series of tubes having a fluid passing therethrough and controlled by the heater 20 and cooler 18 as in the previous embodiment. The tubing illustrated comprises tempering coils 35 having fins 36 mounted thereon and tubes 37. The drying gas can now be seen to flow through finned coils 35 and immediately and successively across the product trays 32 and desiccant trays 34 and recirculated back towards the top of the drying chamber. The remaining structure of the drying chamber is as discussed hereinabove.

An important feature of the embodiment of FIG. 2 is that it allows for maintaining narrow strips of the product to be dried immediately adjacent strips of absorbent. The product strips may be six inches or less with a thickness on the order of 3/8 inch. The desiccant is of the same thickness as the product and may be twice the width, twelve inches. Although only a single product and desiccant tray are illustrated, any desired pattern of product and desiccant may be employed to achieve the desired dehydration.

It should now be appreciated that with the arrangement illustrated in FIG. 2, the drying gas is allowed to immediately cause the transfer of the frozen liquid from the product to the desiccant to effect the drying action.

What is claimed is:

1. A method of dehydrating including the steps of arranging a heat-sensitive product to be dried in a gas drying chamber with a desiccant in a preselected pattern of product and desiccant in a side-by-side relationship so that when a drying gas is circulated through the chamber it flows across the surface of the product and then immediately flows across the surface of the desiccant whereby the drying gas acts as the vehicle for transferring the moisture from the product undergoing drying to the desiccant, and passing a drying gas heated to a preselected temperature at a preselected velocity and pressure through the drying chamber to cause the drying gas to flow across the surface of the product to be dried for drying the product and then immediately across the surface of the desiccant for drying the gas.

2. A method of dehydrating as defined in claim 1 including the step of monitoring the temperature of the drying gas as it approaches the product undergoing drying and leaves the product, and terminating the drying when the aforementioned temperatures are substantially the same.

3. A method of dehydrating as defined in claim 2 including the step of monitoring the internal temperature of the product undergoing drying.

4. A method of dehydrating as defined in claim 2 including the steps of removing the dried product and wet desiccant from the drying chamber upon termination of the drying and replacing the wet desiccant with a dry desiccant in preparation for the next drying cycle.

5. A method of dehydrating as defined in claim 4 wherein the same desiccant may be re-positioned into the drying chamber after being dried out to a preselected moisture content which drying procedure includes the steps of placing the wet desiccant in a regeneration chamber and driving out the absorbed moisture from the desiccant until a predetermined dryness is achieved and then re-positioning the thus dried desiccant into the drying chamber.

6. A method of freeze drying including the steps of maintaining a frozen product to be dried at a preselected sub-atmospheric pressure, arranging a preselected desiccant in a preselected pattern in a side-by-side relationship with the frozen product to be dried, passing a heated, inert gas at said pressure over the frozen product to be dried to supply the heat of sublimation to the frozen liquid in the product solely through the heat transferred by the gas and at a velocity correlated to the sublimation rate to carry away the liquid vapors from the product to cause the product to uniformly and completely dry, passing the inert gas over the desiccant to cause the moisture transferred thereto from the frozen product to be transferred to the desiccant.

7. A method of freeze drying including the steps of providing a frozen product to be dried, providing a preselected desiccant, arranging the frozen product and the desiccant in a preselected side-by-side pattern so that a drying gas can freely flow across the surface of the frozen product and then immediately across the surface of the desiccant, maintaining the thus defined pattern of frozen product and desiccant at a preselected sub-atmospheric pressure, and passing a heated, inert gas at said pressure over the pattern of frozen product and desiccant to supply the heat of sublimation to the frozen liquid in the product to cause the moisture removed from the product to be transferred to the desiccant until the product is uniformly and completely dry.

8. A method of freeze drying as defined in claim 7 wherein the gas is hydrogen and the desiccant has any absorbed water removed therefrom prior to being arranged in a pattern.

9. A method of freeze drying as defined in claim 7 including recirculating the heated inert gas over the pattern of frozen product and desiccant until the product is uniformly and completely dry and cooling the gas during recirculation to prevent the product from thawing during the continuous recirculation of the gas.

10. A method of freeze drying as defined in claim 9 wherein the recirculating gas is heated during the transfer of the moisture from the frozen product to the desiccant and cooling the recirculating gas sufficiently to avoid the continuous increase of temperature of the gas on recirculation to prevent thawing of the frozen product.

11. A method of freeze drying as defined in claim 10 including the steps of monitoring the temperature of the recirculating gas as it approaches the frozen product and the temperature of the gas as it leaves the product, and terminating the drying when the aforementioned temperatures are substantially the same.

12. A method of freeze drying as defined in claim 11 including the step of monitoring the internal temperature of the product undergoing drying.

13. A method of freeze drying as defined in claim 11 wherein the gas is hydrogen and the hydrogen gas is maintained at a sub-atmospheric pressure on the order of 24 millimeters of mercury, a temperature of approximately 175 degrees Fahrenheit and a velocity on the order of 2000 feet per minute.

References Cited
UNITED STATES PATENTS

| | | | |
|---|---|---|---|
| 2,897,600 | 8/1959 | Graham | 34—5 |
| 3,031,381 | 4/1962 | Langerhaus | 34—5 |
| 3,096,163 | 7/1963 | Meryman | 34—5 |
| 3,271,873 | 9/1966 | Harper | 34—5 |
| 3,299,525 | 1/1967 | Thuse | 34—5 |
| 3,313,032 | 4/1967 | Malecki | 34—5 |

WILLIAM J. WYE, Primary Examiner

U.S. Cl. X.R.

34—43, 72